(No Model.) 3 Sheets—Sheet 1.

F. W. OLIN.
AIR BRAKE.

No. 598,678. Patented Feb. 8, 1898.

WITNESSES:

INVENTOR
Franklin W. Olin,
BY
J. C. Chapin,
his ATTORNEY (No Model.) 3 Sheets—Sheet 2.

F. W. OLIN.
AIR BRAKE.

No. 598,678. Patented Feb. 8, 1898.

WITNESSES:
D. N. Hayward
Wm. B. Wright

INVENTOR
Franklin W. Olin,
BY
J. C. Chapin
his ATTORNEY (No Model.) 3 Sheets—Sheet 3.

F. W. OLIN.
AIR BRAKE.

No. 598,678. Patented Feb. 8, 1898.

WITNESSES:

INVENTOR
Franklin W. Olin,
BY
J. C. Chapin,
his ATTORNEY

UNITED STATES PATENT OFFICE.

FRANKLIN WALTER OLIN, OF ST. LOUIS, MISSOURI.

AIR-BRAKE.

SPECIFICATION forming part of Letters Patent No. 598,678, dated February 8, 1898.

Application filed December 19, 1896. Serial No. 616,245. (No model.)

*To all whom it may concern:*

Be it known that I, FRANKLIN WALTER OLIN, a citizen of the United States, residing at St. Louis, in the State of Missouri, have invented a new and useful Improvement in Air-Brakes, of which the following is a specification.

My invention relates to the pump and pump-operating mechanism for air-brakes; and the objects of my invention are to provide an improved manner of connecting and disconnecting the operating parts of the pump with its actuating mechanism, an improved system of lubricating the parts, an improved method of attaching parts to a car-axle, and an improvement in the construction of the parts, whereby the amount of space occupied thereby is reduced to a minimum, the construction simplified, and the working parts condensed.

My invention also consists in the novel construction, combination, and arrangement of parts hereinafter described.

I will proceed to describe a device embodying my invention, with reference to the accompanying drawings, and will then point out the novel features in the claims.

Figure 1:
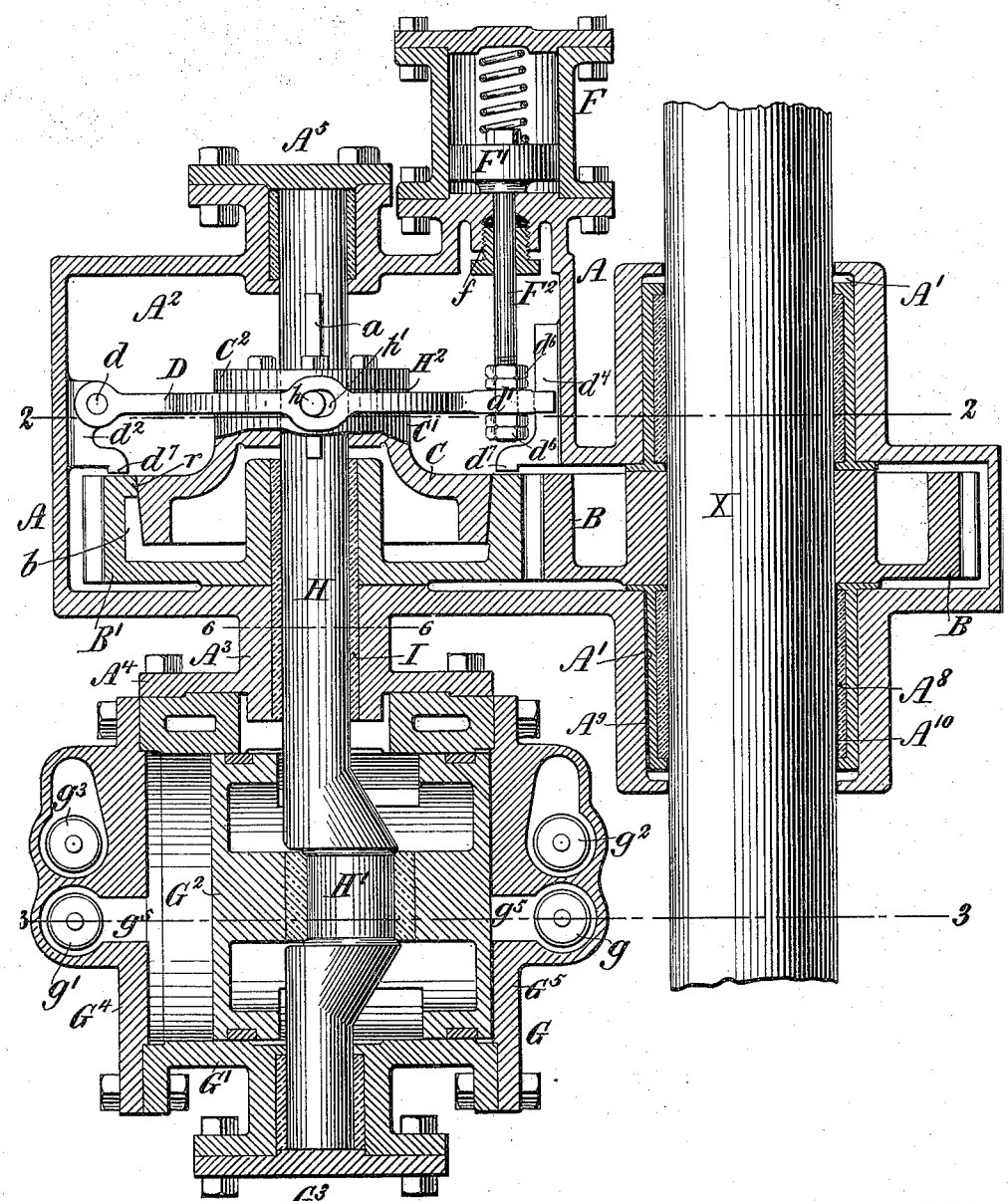
Figure 2:
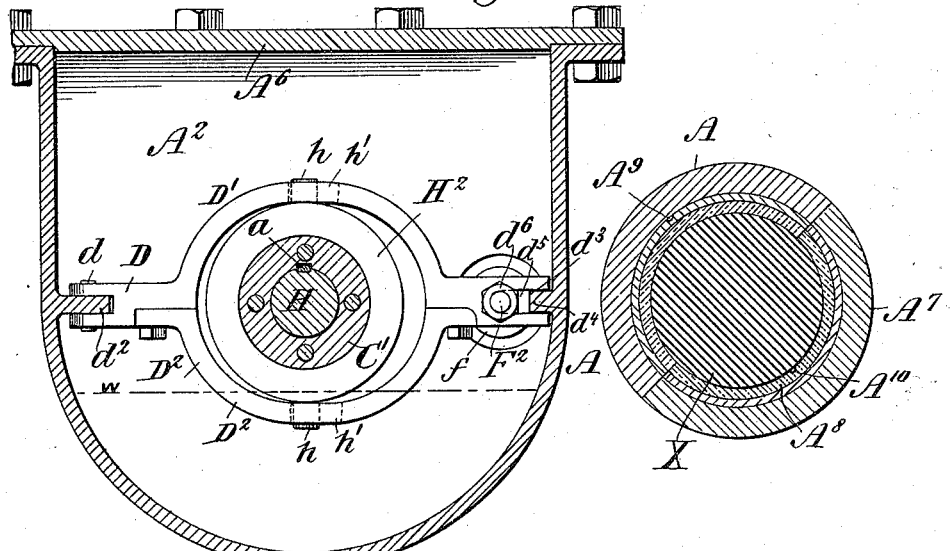
Figure 3:
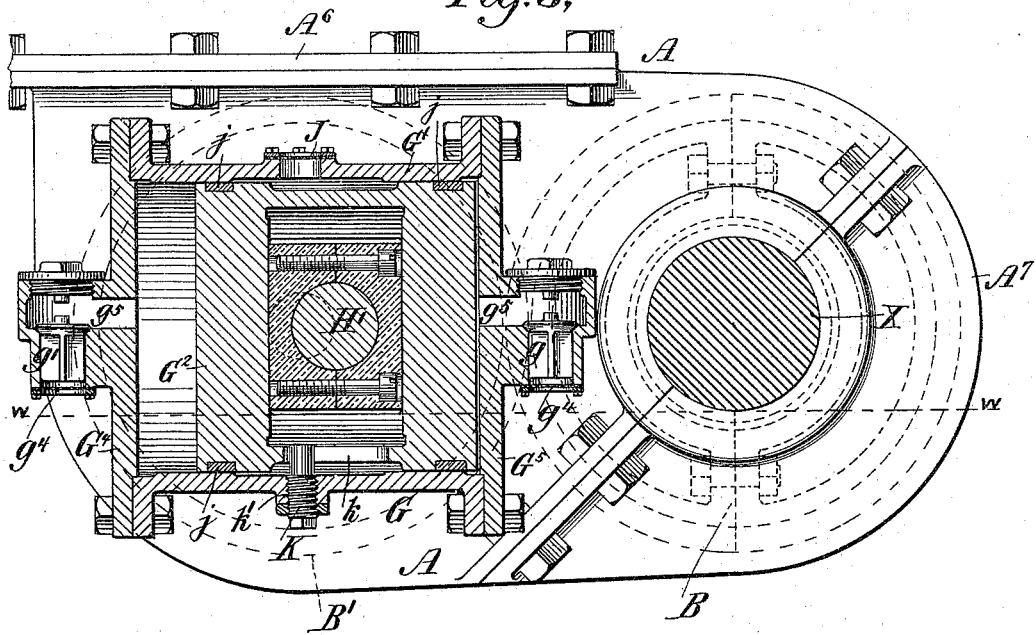

Figure 1 is a horizontal section of the device on a line with the axle of a car. Fig. 2 is a section on line 2 2 of Fig. 1; Fig. 3, a section on line 3 3 of Fig. 1; and Fig. 4, a detached view, partly in section, of one member of a clutch. Fig. 5 is a transverse section through the same, and Fig. 6 is a detail section on line 6 6 of Fig. 1.

Similar letters of reference designate corresponding parts in all figures.

A is a casing comprising two communicating chambers A' and A$^2$. A' incloses a portion of the car-axle X and gear-wheel B, rigidly mounted thereon and for convenience made in two pieces and bolted together, as shown in dotted lines, Fig. 3. Inclosed by chamber A$^2$ is gear-wheel B', which also forms one member of a clutch loosely mounted on bushing I, surrounding pump-shaft H and mounted in hub A$^3$ in head of casing A. Clutch C designates the other member of the clutch and is splined on shaft H, and D is a lever fulcrumed at $d$ for throwing said clutch in and out of operative position. At one end of chamber A$^2$ and at one side thereof is bolted a pump-governor F, having a piston F' and a piston-rod F$^2$, extending into chamber A$^2$ through a stuffing-box $f$, formed in the wall of said chamber, the piston-rod F$^2$ being loosely connected with lever D at $d'$. A pump or air-compressor G is bolted to flange A$^4$ on hub A$^3$ at the opposite side of said chamber A$^2$. The pump-operating shaft H extends through chamber A$^2$ and pump-chamber G, having a bearing A$^5$ at one of its ends, cast in the wall of chamber A$^2$, its opposite end being provided with bearing G$^3$, cast in pump-casing G', and with a bearing intermediate of its ends in the before-mentioned hub A$^3$. Pump G consists of a casing or cylinder G', having a piston G$^2$, which is reciprocated by pump-operating shaft H through crank H', formed thereon. Pump-operating shaft H is rotated by gear-wheel B on axle X through connections hereinafter described. Pump cylinder or casing G' is provided with heads G$^4$ and G$^5$, containing inlet-valves $g$ $g'$ and discharge-valves $g^2$ $g^3$. The inlet-valves $g$ and $g'$ connect, as shown more clearly in Fig. 3, at one side, through a wire-cloth $g^4$, with the atmosphere, and at the other side, through ports $g^5$, with the interior of the cylinder. Discharge-valves $g^2$ $g^3$ connect at one side with the interior of the cylinder and by suitable connections with the air-reservoir. (Not shown.)

Referring now to pump-governor F, which may be of the usual or any desired construction, that part here shown comprises a piston F' and piston-rod F$^2$, which, through its connection with lever D in its present position, will throw clutch member C into engagement with gear-wheel B'. Hence when piston F' is at its opposite stroke clutch member C will through said connection be thrown out of such engagement. Clutch member C is mounted to rotate with shaft H, but is adapted to move thereon in the direction of its length through feather $a$. A collar H$^2$ is loosely mounted on hub C' of clutch member C and is retained in position by cap C$^2$, bolted thereto. The collar H$^2$ is provided with trunnions $h$, which are engaged by lever D. Lever D is here shown as made up of two parts D' and D$^2$, the central portion forming a yoke which surrounds the collar H$^2$. Slots $h'$ are provided in line with the center of the yoke and with which trunnions $h$ engage.

The lever D is pivoted at $d$ to a lug $d^2$ upon the side of the casing A and cast integral with or bolted thereto. The opposite end of lever D is bifurcated, as at $d^3$, and has a sliding engagement with a lug $d^4$ on the corresponding side of the casing. The lugs $d^2$ and $d^4$ are also provided with projections $d^7$, which are in proximity to but normally do not touch the face of the gear B'. When, however, the clutch C is withdrawn, they will prevent the gear B' from being appreciably moved therewith. The pump-governor piston-rod $F^2$ is here shown as passing through a slot $d^5$ in the lever D. Suitable adjustment is provided through the medium of lock-nuts $d^6$. The slots $d^5$ and $h'$ are merely for the purpose of allowing play to compensate for the arc through which the lever D travels consequent upon its pivotal engagement at $d$.

The chamber $A^2$ is provided with a cover $A^6$, which completely closes the same, and the casing A', as more clearly shown by reference to Fig. 3, is made in two pieces and bolted together. The portion $A^7$ forms a cap, which, when bolted to the main portion of the casing A, completely incloses the chamber A'. Suitable bearings $A^8$ are provided within the chamber A' and form a support for the casing A upon the axle X. The casing is maintained in its position lengthwise of the axle by the fact of the gear-wheel B being rigidly mounted thereon. A suitable support must be provided for the opposite side of the casing A and attached to some fixed portion of the car-truck, as the channel-bar of the truck.

One of the great difficulties in connection with air-brakes is in keeping the parts well oiled. This arises partly from the negligence of the employees who should attend to this matter and partly in the difficulty in getting at the parts to oil them. It is very essential, however, in an air-brake system that the movable parts should be kept well oiled, partly because they are almost always in the presence of large quantities of dust. To obviate this difficulty, I make the casing composing chambers A' and $A^3$, as will be seen by reference to the drawings, practically fluid-tight and dust-proof, and I have so arranged them as to form an oil-carrying reservoir. The oil-line I preferably make up to about the level of the under side of the axle X. I have shown a dotted line $w$ in Figs. 2 and 3 to indicate about this line. In this way the gears B and B' will be partially running in oil, and during their revolutions the gear-wheel B will transfer some of this oil to bearings $A^8$, and the oil will pass along grooves $A^9$ to the ends of the chamber A' and return through the grooves $A^{10}$, lubricating the axle and maintaining a circulation of oil. The clutch member C will be also partially running in oil and hence will not be liable to jam, cut, or wear.

Figure 4:
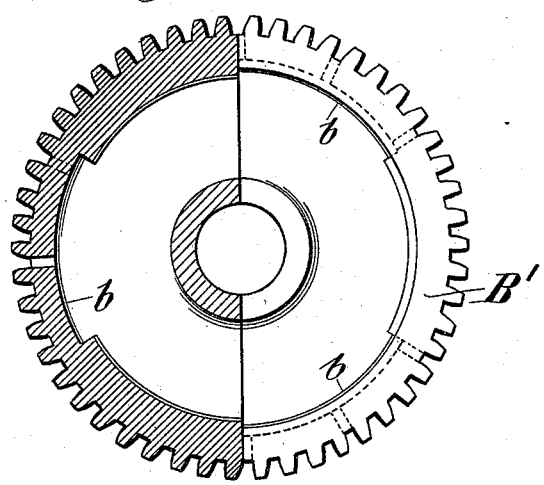
Figure 5:
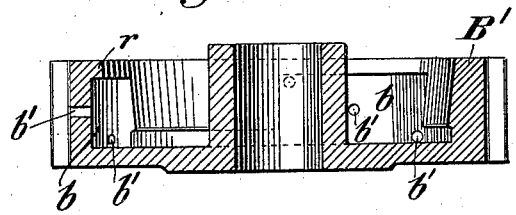
Figure 6:
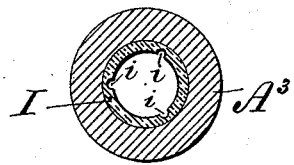

In Figs. 4 and 5 I have shown the clutch member, which also comprises the gear B', in detail in order to illustrate more fully the oil-chambers $b$, in which the oil is collected and from whence it can flow to the teeth of the gear through holes $b'$. I have provided the clutch member with these oil-chambers because I found by experience that if the clutch were run in oil without any relief a film of oil would be formed between the two clutch members and prevent good frictional contact when required. The edges of these chambers form scrapers for removing the superfluous quantity of oil from the face of the clutch member C, and the oil when removed is received in the collecting-chambers $b$. When clutch member C is in engagement with gear-wheel B', the flow of oil into chambers $b$ is cut off by the close contact of rim $r$ with clutch member C. By the splashing of the oil in chamber $A^2$ it will be communicated to bearing $A^5$ and intermediate bearing in hub $A^3$. I have provided the bushing I with grooves $i\ i$, as shown in detail Fig. 6, and through these grooves the oil will communicate with the interior of the hollow piston $G^2$ and to the central portion of the pump-cylinder G'. The splashing of the oil caused by the movement of the piston will cause the same to lubricate crank H' and bearing $G^3$. If desirable, all the bearings may be grooved in the same manner as I have shown in bushing I, causing a free and complete circulation of oil. I have shown, as will be seen by reference to Fig. 3, a vent J in the top of pump-cylinder G', the vent being covered by a wire-cloth to prevent the ingress of dirt. In the lower side of said cylinder I have shown a pin K, the end of said pin engaging with a slot $k$ in the hollow piston $G^2$. The pin K and slot $k$ perform a double function. First, they prevent the rotation of the piston $G^2$ while permitting its reciprocation, and, second, when the pin K is removed the slot $k$ and screw-thread socket $k'$ form a discharge through which the oil may be allowed to drain.

The vent J is of great importance, as it allows the escape of air which may leak past the packing-rings $j$ of the piston $G^2$, and if there were no vent the compressed air would gradually drive all the oil out of the cylinder G' through the bushing I into the chamber $A^2$ and might eventually force all the oil out of this chamber and chamber A' through the bearings $A^8$. Furthermore, a vapor is likely to be given off by the oil through the heating of the parts, and consequently of the oil, and also by the heating of the oil through churning, and this vapor finds escape through vent J.

I have constructed the portion of the casing A inclosing chamber A', which includes also cap $A^7$, by dividing the same on a line passing through the center of the axle at an angle of about forty-five degrees to a horizontal line for convenience in assembling. The upper or main portion being suitably supported at its opposite end can be, as it were, hooked onto the axle, and the cap then adjusted into position, and by this construction the weight of the casing falls upon the solid or hooked portion of the casing and not upon a joint, as it would if the parts were bolted in a vertical line.

The gear-wheel B continuously rotates while the car is in motion and engages the rotating gear-wheel B'. Normally the gear-wheel B' runs free, and the pump-shaft H is stationary. When, however, the clutch C is thrown by the pump-governor into the position shown in the drawings, the shaft H is caused to rotate and to operate the pump. The withdrawal of clutch C again causes the cessation of the pumping action.

What I claim as my invention, and desire to secure by Letters Patent, is—

1. In an air-brake system the combination with a pump, a pump-operating shaft, pump-operating mechanism and means whereby the pump-operating mechanism may be thrown in and out of engagement with the pump-operating shaft, of an inclosed casing carrying the bearings and supports for said moving parts, the said inclosed casing forming an oil-reservoir, substantially as specified.

2. In an air-brake system the combination with a pump, a pump-operating shaft, pump-operating mechanism and means whereby the pump-operating mechanism may be thrown in and out of engagement with the pump-operating shaft, of an inclosed casing carrying the bearings and supports for said moving parts, the said inclosed casing forming an oil-reservoir and a vent in the upper part of said casing, substantially as specified.

3. In an air-brake system the combination with a pump, a pump-operating shaft, pump-operating mechanism and means whereby the pump-operating mechanism may be thrown in and out of engagement with the pump-operating shaft, of an inclosed casing carrying the bearings and supports for said moving parts, the said inclosed casing forming an oil-reservoir, a hollow pump-piston reciprocating in a portion of said casing, and a vent connecting with the interior of said hollow piston, substantially as and for the purpose set forth.

4. In an air-brake system the combination with a pump, a pump-operating shaft, pump-operating mechanism and means whereby the pump-operating mechanism may be thrown in and out of engagement with the pump-operating shaft, of an inclosed casing carrying the bearings and supports for said moving parts, the said inclosed casing forming an oil-reservoir, a hollow pump-piston reciprocating in a portion of said casing, a slot in the lower portion of said hollow piston connecting with the interior portion thereof and a removable plug passing from the outside of said casing and into the said slot, substantially as specified.

5. In an air-brake system the combination with a pump and pump-operating mechanism, a gear made in two parts and bolted together on the axle of a car and adapted to engage with the pump-operating mechanism, of a casing inclosing said pump and pump-operating mechanism and said gear, and surrounding said axle, a portion of said casing surrounding said axle being removably attached thereto in the form of a cap, substantially as specified.

6. In an air-brake system the combination with a pump and a pump-operating shaft of a gear-wheel forming one member of a beveled clutch, oil-collecting chambers in the beveled portion of said clutch member, said gear and clutch member being mounted to rotate with the axle of a car, another clutch member mounted to rotate with the pump-operating shaft, a casing forming an oil-reservoir in which said clutch members partially submerged in oil are adapted to rotate, and means whereby the clutch members may be brought in and out of operative engagement with each other, substantially as specified.

7. In an air-brake system the combination with a pump and a pump-operating shaft, of a gear-wheel forming one member of a beveled clutch, oil-collecting chambers in the beveled portion of said clutch member, oil-drains from said oil-collecting chambers to the exterior of the clutch member, said gear and clutch member being mounted to rotate with the axle of the car, another clutch member mounted to rotate with the pump-operating shaft, a casing forming an oil-reservoir in which said clutch members partially submerged in oil are adapted to rotate, and means whereby the clutch members may be brought in and out of operative engagement with each other, substantially as specified.

8. In an air-brake system the combination with a pump and a pump-operating shaft, of a gear-wheel forming one member of a beveled clutch, oil-collecting chambers in the beveled portion of said clutch member, oil-drains from said oil-collecting chambers to the exterior of the clutch member, said gear and clutch member being mounted to rotate with the axle of the car, another clutch member mounted to rotate with the pump-operating shaft, a clutch-lever in engagement with said last-named clutch member, a pump-governor and a connection between said clutch-lever and said pump-governor whereby the clutch members may be brought in and out of operative engagement with each other, and a casing forming an oil-reservoir in which said clutch members partially submerged in oil are adapted to rotate, substantially as specified.

In testimony whereof I have signed my name to this specification in the presence of two subscribing witnesses.

FRANKLIN WALTER OLIN.

Witnesses:
 S. CRISTY MEAD,
 HOWARD K. WOOD.